Nov. 24, 1953 H. A. BUEHNER 2,660,053
FLEXIBLE SEAM TESTING DEVICE
Filed Feb. 2, 1950

INVENTOR.
Howard A. Buehner
BY Andrus & Sceales
ATTORNEYS.

Patented Nov. 24, 1953

2,660,053

UNITED STATES PATENT OFFICE 2,660,053

FLEXIBLE SEAM TESTING DEVICE

Howard A. Buehner, Milwaukee, Wis., assignor to A. O. Smith Corporation, Milwaukee, Wis., a corporation of New York Application February 2, 1950, Serial No. 141,926

3 Claims. (Cl. 73—40)

This invention relates to a flexible device for testing the seams of vessels, pipes and the like.

An object of the invention is to provide a device for determining the porosity or fluid tightness of a seam regardless of the convexity, concavity or other conformation thereof.

Another object of the invention is to provide a seam tester which is constructed of flexible materials so that a single tester may be applied to a variety of types and sizes of structures and to a variety of curvatures of seams on said structures.

Another object of the invention is to provide a seam testing device which may be applied in one operation to a relatively long length of seam regardless of any protuberances in the object being tested, whereby the speed of seam testing may be increased and the cost thereof diminished.

Another object of the invention is to provide a seam tester having a magnifying means to aid in the detection of minute apertures in the seam being tested.

Another object is to provide a seam tester of light weight and readily manipulated by a single workman.

The seam testing device, in general, comprises a generally rectangular rubber casing having a flexible transparent window at its upper portion and a wide sealing lip at its lower portion so that a vacuum may be readily produced within the casing after application of the device to the seamed surface to be tested. The presence of a leak may then be determined by observing the presence of bubbles in water or a soap solution previously applied to the seam. In another embodiment of the invention, the transparent window is shaped to magnify the bubbles and facilitate detection of minute apertures in the seam or joint being examined.

Other objects and advantages of the invention will appear in the following description of embodiments of the invention illustrated in the accompanying drawings.

Figure 1:
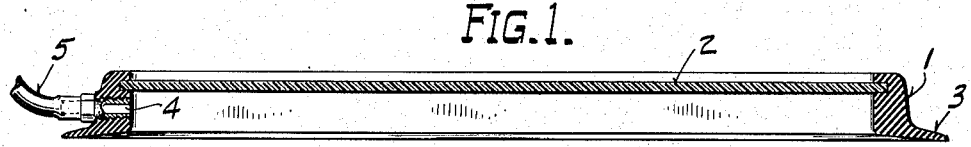
Figure 1 is a longitudinal sectional view of a seam testing device as applied to a straight seam.
Figure 2:
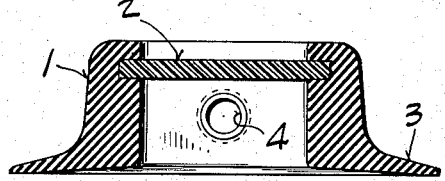
Fig. 2 is a vertical cross-section of the tester.

Referring to the drawings and particularly to Figs. 1 and 2, the invention is shown as embodied in a seam testing device having a generally rectangular casing 1, a window member 2 sealed in a slit at the upper portion of the casing, and a lateral lip 3 formed integral with the lower portion of the casing and extending around the entire perimeter thereof to aid in sealing the same against the surface of the object being tested. The tester is evacuated through a fitting 4 located at one end of the casing 1 and connected through a hose 5 to a suitable two position air valve and vacuum pump, not shown.

Figure 3:
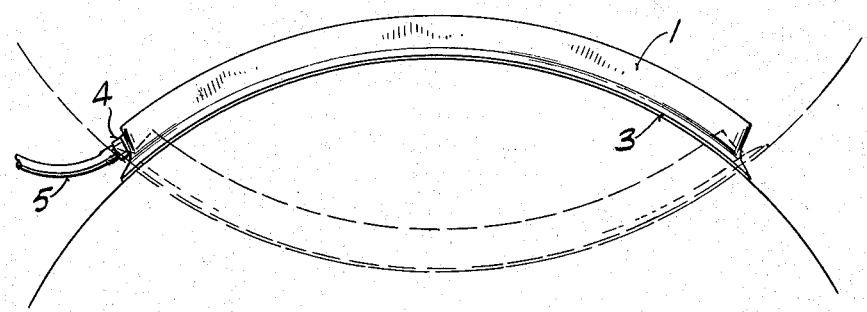
Fig. 3 is a side elevation of the invention showing its flexibility in testing either a convex or a concave seam.
Figure 4:
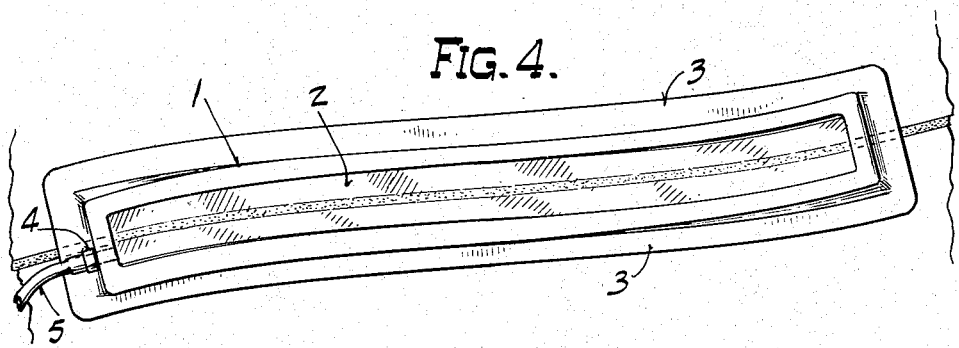
Fig. 4 is a top plan view of the testing device illustrating how it may be twisted and applied to a seam of irregular curvature.

The casing 1 and lip 3 are constructed of soft rubber or other highly flexible and deformable material and the window member 2 is made of a flexible transparent material, for example Plexiglas or a similar plastic. Accordingly, the seam tester may be readily flexed and applied to various diameters of convex or concave seams, as illustrated in Fig. 3, and to irregularly twisting seams such as the one shown in Fig. 4.

Because of its flexibility, the form of the device illustrated in the drawings may be used to test all of the seams and joints in large pipes and spherical tanks, etc., and the majority of seams in cylindrical and rectangular vessels and the like. To test seams at the corners and edges of rectangular vessels it is necessary to use modified forms of the invention, but vessels having rounded corners or edges may be tested by the form herein described.

In testing long seams it is desirable to use a relatively long tester so that a considerable length of seam may be examined in one operation. This may be accomplished with the present invention regardless of any large bulges or depressions in the object being tested since these irregularities present no obstructions to a flexible tester although they would prevent the use of a long testing device constructed of rigid materials.

To examine a seam or joint for apertures, the operator first brushes a soap solution on a portion of the seam and applies the tester thereto so that the moistened portion of the seam is effectively isolated by the sealing lip 3 and the lower portion of the casing 1. He then starts the vacuum pump, creating a partial vacuum within the tester and causing air to enter through any leaks in the seam and form bubbles in the soap solution. After observing the bubbles through the window 2, the operator releases the vacuum, records the location of the leak, and repeats the testing operation until the entire seam has been examined.

The sealing lip 3 is preferably tapered and curved downwardly so that the tester rests on its thin outer edge at all times except during the testing operation. When a vacuum is created during the testing operation the resulting pressure differential causes the lower portion of the tester to be pressed firmly against the object being tested, with the lip 3 providing a suction cup action and aiding in the creation of an effective and resilient seal. The lip 3 is particularly desirable in the testing of a longitudinal pipe seam since its downward curvature conforms to the curvature of the pipe.

In operating the tester, water may be used in place of a soap solution and the presence of leaks determined by the bubbles in the water. For example, a suitable amount of water may be piped into the tester as it is being evacuated and the bubbles observed after the desired vacuum is attained.

Figure 5:
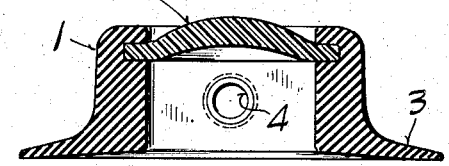
Fig. 5 is a cross-sectional view of an embodiment of the invention wherein a curved magnifying window is employed in place of the flat window illustrated in Figs. 1 and 2.

In the embodiment of the invention illustrated in Fig. 5, the window member 3 is made of a flexible transparent material having an arcuate thickened portion which serves to magnify the bubbles. Magnification is desirable not only where the leak is extremely small but where it is necessary to observe the tester from a distance. The degree of magnification should not be too great, however, since the thickness of the member 3 which would be necessary for a high degree of magnification might decrease the flexibility of the device.

The seam testing device described in connection with the embodiments of the invention is highly effective in the rapid testing of seams and joints on many types of structures. Because of its flexibility, the same device may be used to test various curvatures of seams which would otherwise require a large number of differently shaped testers.

Various embodiments of the invention may be employed within the scope of the accompanying claims.

I claim:

1. In a seam testing device of the type wherein a partial vacuum is created over the seam to be tested and the presence of leaks in said seam is determined by observing the activity of a substance previously applied thereto, a highly flexible open-bottomed elongated casing adapted to be applied either to a flat or a curved surface and shaped to isolate a portion of the seam when placed in engagement with the seamed surface being examined, a highly flexible transparent window member in said casing, and means to create a partial vacuum within said casing during the testing operation.

2. In a device for testing the seams and joints of various types and sizes of vessels and pipes and the like, an open-bottomed soft rubber elongated casing adapted to be applied either to a flat or a curved surface and shaped for engagement with the seamed surface to be tested, a laterally extending soft rubber lip disposed at the lower portion of said casing to aid in sealing the same against said surface, a window member in said casing formed of a transparent plastic substance having a high degree of flexibility, and means to partially evacuate said casing when the same is placed in engagement with said surface to draw air through any apertures in said surface and form bubbles in a liquid previously applied thereto.

3. In a seam testing device of the type wherein a partial vacuum is created over the seam to be tested and the presence of leaks in said seam is determined by observing bubbles in a fluid previously applied thereto, a highly flexible open-bottomed elongated casing adapted to be applied either to a flat or a curved surface and shaped to isolate a portion of the seam when placed in engagement with the seamed surface being examined, a highly flexible transparent window member disposed at the upper portion of said casing and shaped to magnify the bubbles in said fluid, and means to create a partial vacuum in said casing during the testing operation.

HOWARD A. BUEHNER.

References Cited in the file of this patent

UNITED STATES PATENTS

| Number | Name | Date |
| --- | --- | --- |
| 2,108,176 | Newby | Feb. 15, 1938 |
| 2,206,437 | Tracy | July 2, 1940 |
| 2,313,688 | Wappner et al. | Mar. 9, 1943 |
| 2,387,851 | Lown et al. | Oct. 30, 1945 |

FOREIGN PATENTS

| Number | Country | Date |
| --- | --- | --- |
| 504,638 | Great Britain | Apr. 28, 1939 |
| 857,777 | France | Sept. 28, 1940 |